(12) United States Patent
Kozaczuk et al.

(10) Patent No.: US 9,113,039 B2
(45) Date of Patent: Aug. 18, 2015

(54) WIRELESS SHARING OF CONTENT BETWEEN COMPUTING DEVICES

(71) Applicant: INTEL CORPORATION, Santa Clara, CA (US)

(72) Inventors: Anthony Kozaczuk, Burlingame, CA (US); Hung Huynh, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/032,444

(22) Filed: Sep. 20, 2013

(65) Prior Publication Data

US 2015/0086011 A1  Mar. 26, 2015

(51) Int. Cl.
*G06F 3/00* (2006.01)
*H04N 7/167* (2011.01)
*H04L 29/06* (2006.01)

(52) U.S. Cl.
CPC .......... *H04N 7/1675* (2013.01); *H04L 63/0428* (2013.01)

(58) Field of Classification Search
CPC .......................... H04N 7/1675; H04L 63/0428
See application file for complete search history.

(56) References Cited

U.S. PATENT DOCUMENTS

| | | | |
|---|---|---|---|
| 2006/0251096 A1* | 11/2006 | Metsker | 370/422 |
| 2008/0303946 A1* | 12/2008 | Cox et al. | 348/552 |
| 2009/0305694 A1* | 12/2009 | Zheng et al. | 455/426.1 |
| 2010/0220977 A1* | 9/2010 | Kwon et al. | 386/94 |
| 2011/0178863 A1* | 7/2011 | Daigle | 705/14.31 |
| 2011/0285807 A1* | 11/2011 | Feng | 348/14.08 |
| 2012/0098841 A1* | 4/2012 | Emerson | 345/520 |
| 2012/0106930 A1* | 5/2012 | Amin et al. | 386/278 |
| 2014/0195784 A1* | 7/2014 | Ivanov | 712/225 |

\* cited by examiner

*Primary Examiner* — Jing-Yih Shyu
(74) *Attorney, Agent, or Firm* — International IP Law Group, P.L.L.C.

(57) ABSTRACT

A system and method for video content sharing are given. A wireless controller of a first computing device receives a multi-gigabit-per-second transmission of a compressed and encrypted remote frame buffer from a second computing device, and stores the compressed and encrypted remote frame buffer in local memory. An integrated graphics controller of the first computing device decompresses and decrypts the remote frame buffer, and renders a composite frame buffer of the remote frame buffer and a native or local frame buffer of the first computing device.

20 Claims, 5 Drawing Sheets

WIRELESS SHARING OF CONTENT BETWEEN COMPUTING DEVICES

TECHNICAL FIELD

This disclosure relates generally to techniques for sharing content between computing devices. More specifically, the disclosure describes techniques for wirelessly sharing content including video data between computing devices at multi-gigabit-per-second wireless transmission.

BACKGROUND

As technologies advance with computing devices, challenges and opportunities exist with the delivery and presentation or high-definition display of premium content to the user or consumer employing such computing devices. These computing devices may include desktop personal computers (PCs), all-in-one (AIO) computers, tablet devices, smartphones, laptop computers including Ultrabook™ computers, and the like. Of course, proprietary issues and protection of the premium content should generally be considered. Moreover, aspects such as the form and capacity of network communication, graphics processing, and so on, may be deliberated.

DETAILED DESCRIPTION

This disclosure relates generally to techniques for sharing content including premium video content between computing devices. More specifically, the disclosure describes techniques for wirelessly sharing content including video data between the computing devices at multi-gigabit-per-second wireless transmission. Embodiments of the techniques provide for screen sharing including frame buffer merging of premium content among computer devices via Wireless Gigabit Alliance (WiGig) capability and providing for picture-in-picture (PIP) presentation. Embodiments provide the user with capability to wirelessly over WiGig transmission share high definition (HD) premium content from a home or mobile device (e.g. tablet, Ultrabook™, etc.) to another computing device (e.g. tablet, Ultrabook™, AIO computer, desktop computer, etc.) and provide PIP capability. Lastly, while the present disclosure may focus on the sharing, transmission, and processing of video data, the skilled artisan will recognize with the benefit of the present disclosure that embodiments are also applicable to audio data.

Figure 1:
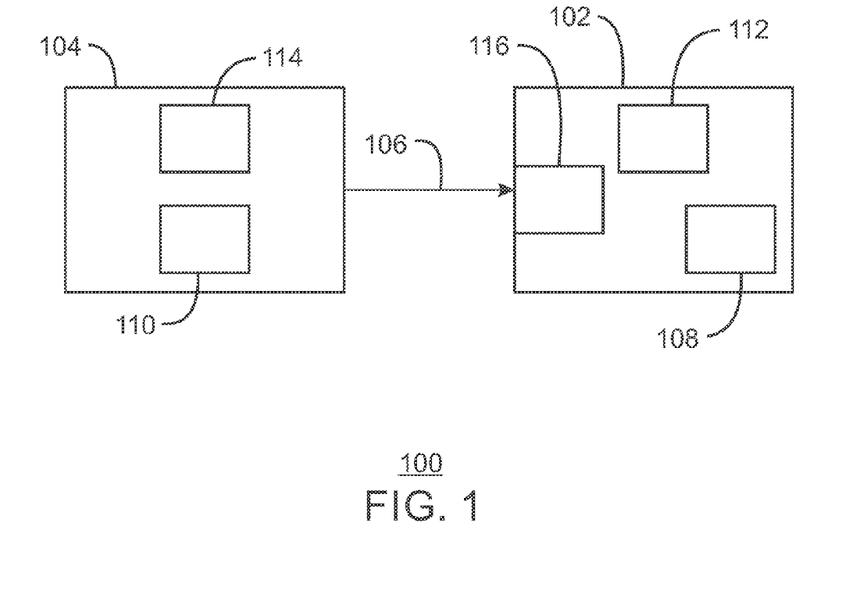
FIG. 1 is a diagrammatical representation of a content sharing system in accordance with embodiments of the present techniques.

FIG. 1 is a content sharing system 100 having a first or local computing device 102 that receives content from a second or remote computing device 104 via a wireless, e.g., radio wave, connection 106. The wireless connection 106 may provide for wireless communication of multi-gigabit-per-second, such as per the WirelessHD specification, the Wireless Gigabit Alliance (WiGig) or the Institute of Electrical and Electronic Engineers (IEEE) 802.11ad standard, or similar standard. The multi-gigabit-per-second amount may include up to 7 gigabits per second (Gbps) or greater. Further, the multi-gigabit-per-second transmission may be implemented at relatively higher frequencies, such as at the 60 gigahertz (GHz) radio band or other frequencies.

For such transmission over the wireless connection 106 at relatively higher frequencies between the two devices 102 and 104, the remote computing device 104 may be "local" in a sense that it may reside near the local computing device 102. For instance, with multi-gigabit-per-second speed (e.g., WiGig) connectivity at higher frequencies (e.g., 60 GHz), the remote device 104 and local device 102 may reside within the same room because wireless transmission though walls at higher radio frequencies may be problematic in certain examples. A wireless "local" connectivity between the local computing device 102 and the remote computing device 104 may be beneficial for content sharing between the devices 102 and 104.

In embodiments, the local computing device 102 is labeled a sink and the remote device 104 labeled a source. Both the local computing device 102 and the remote computing device 104 may have a respective display. In a specific example, the local computing device 102 is an all-in-one (AIO) computer having the AIO desktop platform. In another example, the local computing device 102 is a laptop computer. As for the second computing device 104, it may be a tablet computer or laptop computer such as an Ultrabook™ computer, for instance. Of course, the computing devices 102 and 104 may be a variety of other types of computing devices. Indeed, the computing devices 102 and 104 may be desktop personal computers (PCs), servers, AIO computers, tablet devices, smartphones, laptop computers including Ultrabook™ computers, and the like. A local computing device 102 having a high-resolution display may be beneficial or desirable for the display of received high-definition video content.

The computing devices 102 and 104 each have a respective processor 108 and 110, such as a central processing unit (CPU) or other processor, and also may have a hub architecture such as a platform controller hub (PCH), and so on. The processor 108 may be an accelerated processing unit (APU), for instance, and/or include integrated graphics (iGFX) or (IGP), having a graphics controller. The processor 108 iGFX may refer to graphics that are physically in the processor 108 package or integrated into the processor 108 silicon, or functionality built into the chipset. Again, the iGFX may generally have a graphics processing unit or controller.

Further, the computing devices 102 and 104 may each have respective memory 112 and 114. Additionally, the local computing device 102 may have a network interface adapter or controller 116 for the wireless connection 106. The remote computing device 104 may also have a network interface adapter or controller (not shown).

It should be noted that the techniques described herein including the representations given in FIGS. 1-4 are exemplary systems and methods of which the computing architecture will be understood by one of ordinary skill in the art with the benefit of the present disclosure. As appreciated by the skilled artisan, such architecture may include hardware and logic instructions or code stored in computer readable media (memory) and executable by the hardware such as a processor and other structure.

In certain examples, as discussed below with respect to FIG. 2, the local computing device 102 may be configured to wireless dock via the wireless controller 116 to the remote device 104. For instance, the local computing device 102 and its wireless controller 116 may be configured with multi-gigabit-per-second (e.g., WiGig) docking. In operation of such a configuration, the local computing device 102 may display the screen of the remote computing device 104. In particular, the local computer device 102 may use the wireless or WiGig docking to logically switch between displaying its native screen versus the remote screen of the remote computing device 104 using a multiplexer, i.e., multiplexing (muxing) external to the processor 108 and processor 108 iGFX, for example.

In the docking mode, when the local device 102 (e.g., an AIO computer, laptop computer, etc.) displays the screen of the remote device 104, the local device 102 display is typically owned by the remote computing device 104, and the native screen of the local device 102 isolated from display. Such may occur when a user is viewing premium or non-premium video content from the remote device 104 on the display of the local device 102 in the multi-gigabit-per-second (e.g., WiGig) docking configuration. Unfortunately, this type of display muxing generally may not provide capability to view the local device 102 screen along with the remote device 104 screen as a picture-in-picture (PIP) on the display of the local device 102. The wireless (e.g., WiGig) controller 116 in the docking configuration of the local device 102 typically decompresses (and decrypts) the remote video frame buffer received from the memory 114 of the remote computing device 104. The wireless controller 116 in the docking configuration sends a display port (DP) output of the decompressed (and decrypted) remote video frame to the aforementioned multiplexer for presentation on the display of the local device 102.

In contrast and in accordance with embodiments (e.g., of FIGS. 3 and 4) of the present techniques, the wireless controller 116 typically does not decompress (or decrypt) the remote frame buffer but instead stores the compressed (and encrypted) remote frame buffer in local memory 112. Thus, a memory 114-to-memory 112 transfer of the compressed (and encrypted) remote video frame buffer may be provided. The wireless controller 116 may store the received remote frame buffer in local memory 112 via a direct memory access (DMA) action, for example. The processor 108 iGFX of the local device 102 reads the remote frame buffer from the memory 112, decompresses (and decrypts) the remote frame buffer, and renders a composite frame buffer of the remote frame buffer (of the remote device 104) with the native or local frame buffer of the local computing device 102. The processor 108 iGFX outputs the composite frame to the display of the local device 102.

Figure 3:
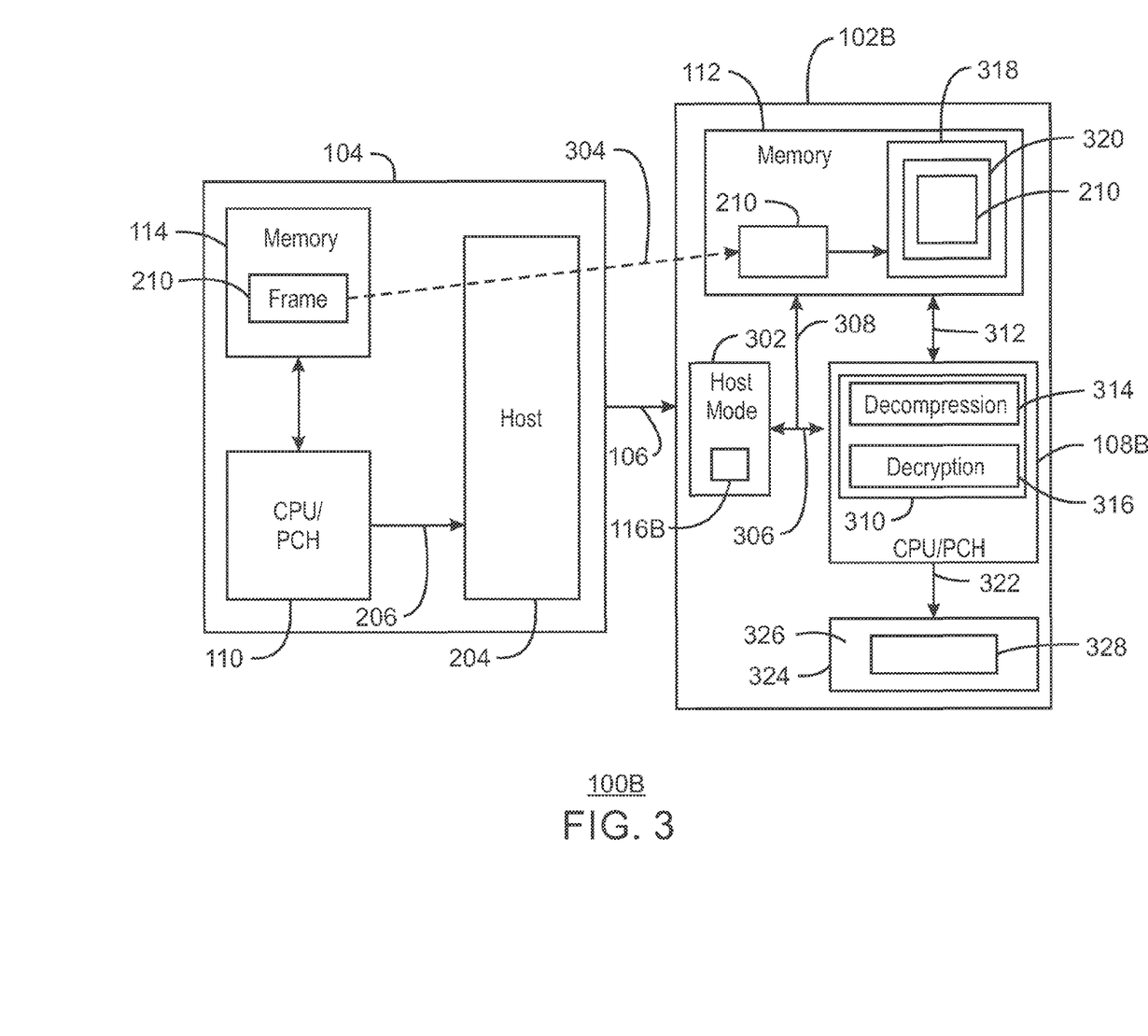
FIG. 3 is a diagrammatical representation of a content sharing system in accordance with embodiments of the present techniques.
Figure 4:
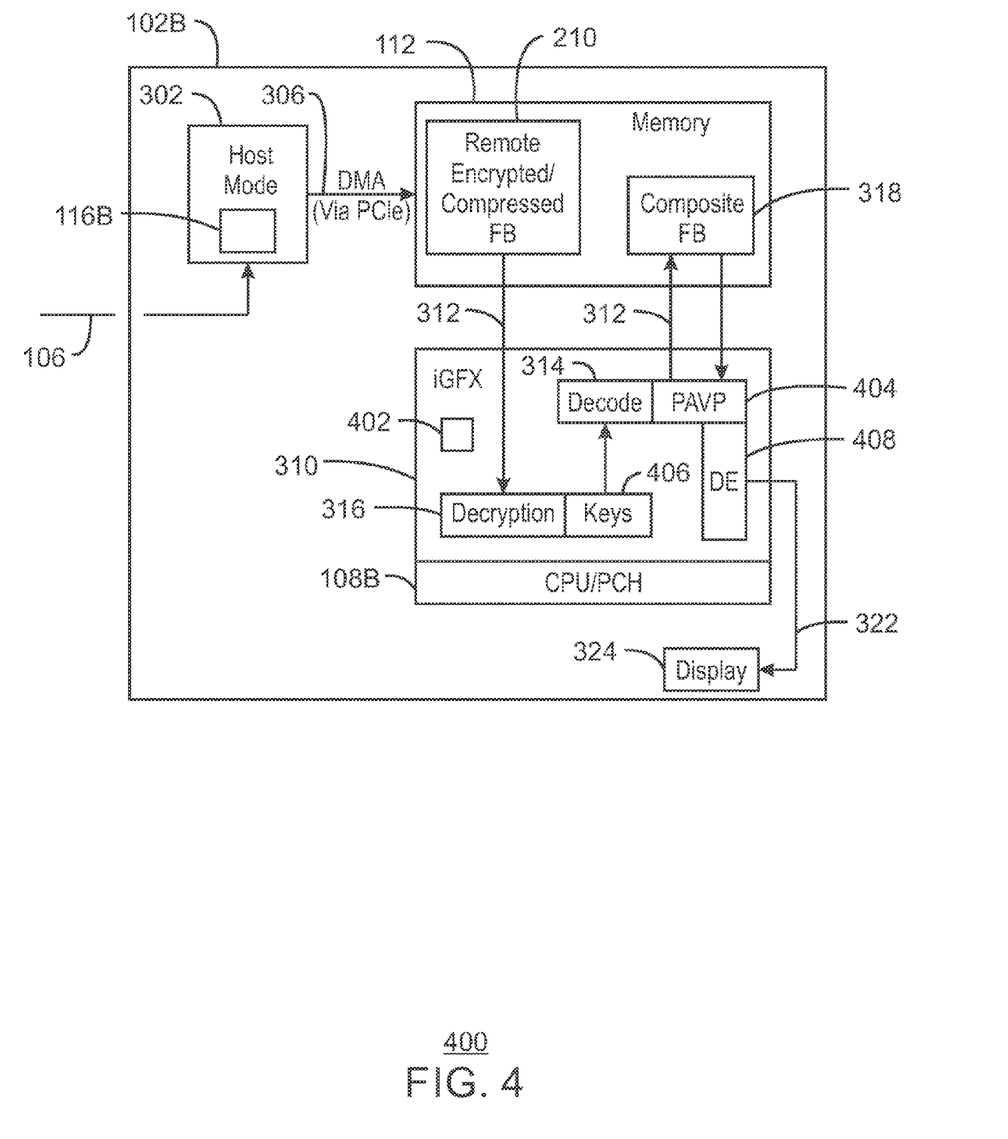
FIG. 4 is a diagrammatical representation of a computing device of the content sharing system of FIG. 3 in accordance with embodiments of the present techniques.

Thus, decompression and decryption of the remote frame buffer (and of other video data) may be offloaded from the wireless controller 116 to the iGFX controller of the processor 108. Further, the iGFX controller may render a composite frame buffer and output the composite frame to the display, in lieu of the local device 102 using the wireless controller 116 to output the remote frame to a multiplexer for presentation of the remote frame or local frame on the display.

Also, as discussed below, the local computing device 102 and its iGFX controller may provide for additional encryption/decryption, such as with Protected Audio Video Path (PAVP) hardware. Such additional encryption/decryption may protect content to and from memory 112 (e.g. during rendering of the composite frame buffer) so that content stored in memory 112 is encrypted, and to complete protection of content through the local device 102 to display.

In certain embodiments (e.g., of FIGS. 3 and 4), the local device 102 may not employ a docking configuration (e.g., FIG. 2) or external multiplexing (e.g., FIG. 2) but instead employ a new "Host" Mode configuration for memory-to-memory transfer of the remote frame buffer, and thus accommodate PIP on the display of the local device 102. In operation, the source data (e.g., remote frame buffer, video content, etc.) from the remote computing device 104 are written via the wireless connection 106 (e.g., WiGig or other multi-gigabit-per-second standard) and wireless controller 116 to memory 112 of the local computing device 102 (e.g., without employing a docking configuration). Thus, again, the local computing device 102 (e.g., an AIO computer, laptop computer, etc.) may incorporate the frame buffer of the remote device 104 without using external multiplexing. Consequently, as discussed below, such may facilitate a picture-in-picture (PIP) of the remote device 104 screen and the local device 102 screen on the display of the local computing device 102.

In particular embodiments (e.g., of FIGS. 3 and 4), as indicated, the local computing device 102 employs a wireless Host Mode (e.g., WiGig Host Mode) instead of a wireless Dock Mode. In wireless Host Mode, the local computing device 102 receives compressed, encrypted (generally if it is premium content) video data from a remote wireless platform (e.g., remote WiGig platform) such as the remote computing device 104 and writes the compressed and encrypted content to its local memory 112. The local computing device 102 ultimately renders a composite frame by merging its local frame and the remote frame from the remote computing device 104, and outputting the composite frame to the display of the local computing device 102. Thus, the PIP mode on the display of the local device 102 may be accommodated.

Furthermore, as indicated, to support and protect sharing of premium video content, the content sharing system 100 including the local computing device 102 may employ various encryption/decryption systems. Examples of such systems include High-bandwidth Digital Content Protection (HDCP or HDCP2), Protected Audio Video Path (PAVP) hardware, and other encryption/decryption systems. Encryption keys may be provided and used. In a specific example to support delivery of premium video content from the remote computing device 104, the local computing device 102 includes HDCP2 decryption along with HDCP2 keys since the local computing device 102 may be acting as an HDCP2 receiver. As mentioned, the PAVP hardware or similar hardware may encrypt/decrypt video data to and from memory 112 to support end-to-end premium video content sharing.

In operation without the docking configuration, the local device 102 receives the video content from the remote computing device 104 and decrypts and decompresses the content via integrated graphics (iGFX). The local device 102 via the iGFX renders the decrypted and decompressed content into the composite frame buffer using PAVP hardware, for example, and the composite frame buffer output from the iGFX to the display of the local computing device 102. Thus, both an initial decryption may be performed such as with HDCP2 decryption for the local computing device 102 as a HDCP2 receiver, and a subsequent encryption/decryption may be performed with PAVP hardware, for example, to maintain protection of premium content through the local computing device 102. In sum, embodiments (e.g., FIGS. 3 and 4) may facilitate end-to-end premium video content sharing and the capability to view that content on the local device 102 display in full screen mode or in PIP mode. With PIP, the screen frame from the remote device 104 and the native screen of the local device 102 may be both visible together on the display of the local device 102.

Figure 2:
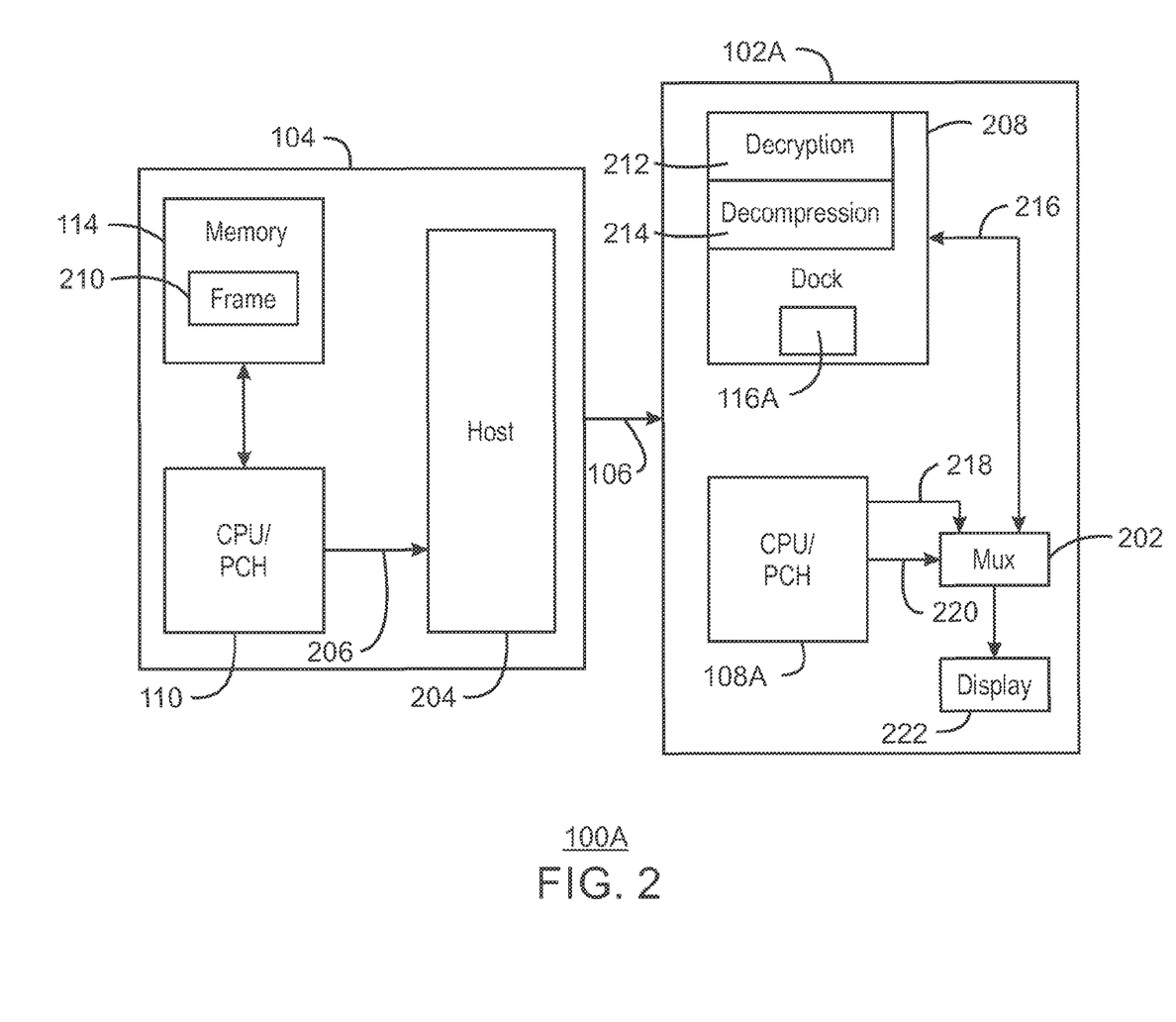
FIG. 2 is a diagrammatical representation of a content sharing system in accordance with embodiments of the present techniques.

FIG. 2 is an example of content sharing system 100A having a wireless video architecture, and with the local computing device 102A in a dock mode. The local computing device 102A employs a multiplexer 202 for screen sharing and thus generally not providing for PIP. The multiplexer 202 gives external multiplexing within the local device 102A, i.e., external to the processor 108A.

The wireless connection 106 may provide multi-gigabit-per-second capability such as with WiGig. In the illustrated example, the source or remote computing device 104 (the remote platform) has a wireless host 204 configuration, such as a WiGig host configuration or other multi-gigabit-per-second host configuration. In certain examples, the wireless host configuration 204 is in communication with the processor 110 of the remote device 104 via peripheral component interconnect express (PCIe) 206. As for the sink, the local computing device 102A (e.g., an AIO platform) has a wireless dock 208 (e.g., WiGig dock).

In operation, the frame buffer 210 of the remote device 104 is transferred to the local device 102A via the wireless connection 106. In particular, the frame buffer 210 content may be transferred as compressed (e.g. H.264 compressed) and also encrypted (e.g., HDCP2 encrypted) from memory 114 of the remote device 104 to the local device 102A. The transfer may occur via the wireless host 204 to the wireless dock 208 using WiGig display extension (also referred to herein as WDE) packets, for instance. At the local device 102A, the wireless dock 208, having a wireless controller 116A, performs decryption, e.g., HDCP2 decryption, of the content using the decrypt module 212 if the content is encrypted as the content may generally be if premium content. Additionally, the wireless dock 208 performs decompression, e.g., H.264 decompression, of the content using the decompression module 214 and sends the decompressed content (e.g., video) as a display port (DP) output 216. As indicated, the DP output 216 from the wireless dock 208 and the Native DP port output 218 are multiplexed at multiplexer 202 within the platform of the local computing device 102A. A selection 220 may be made by a platform selector switch (SW) of the local device 102A using a General Purpose Input/Output (GPIO), for example. When the display 222 is owned by the remote device 104, the native screen of the local device 102A is typically not visible to the user (on the display 222).

FIG. 3 is a content sharing system 100B having a local device 102B (e.g., an AIO computer, laptop computer, desktop computer, etc.) having a wireless "Host" Mode configuration 302 for memory-to-memory transfer of the remote frame buffer 210 and avoiding need for external multiplexing in accordance with embodiments of the present techniques. The wireless "Host" Mode configuration 302 may be a WiGig "Host" Mode configuration or multi-gigabit-per-second "Host" Mode configuration. The system 100B may facilitate end-to-end premium video content sharing and PIP on the display of the local device 102B.

The local computing device 102B and its wireless Host Mode configuration 302 are adapted for transfer (via the wireless connection 106) of the remote frame buffer 210 from memory 114 of the remote device 104 to memory 112 of the first device or local computing device 102B, as indicated by the dotted arrow 304. The wireless "Host" Mode configuration 302 may include a wireless (e.g., WiGig) adapter or interface having a discrete wireless (e.g., WiGig) controller 116B, for example, and which writes the remote frame buffer 210 to local memory 112. The wireless Host Mode configuration 302 is employed instead of the wireless Dock 208 utilized in FIG. 2. Consequently, as indicated, the remote frame buffer 210 is generally not decompressed or decrypted by the wireless controller 116B, or multiplexed, but instead written to memory 112 by the wireless controller 116B.

In the illustrated embodiment of FIG. 3, the wireless Host Mode configuration 302 has a PCIe interface 306 with the processor 108B. In certain embodiments, the wireless Host Mode configuration 302 writes the remote frame buffer 210 to local memory 112 with a direct memory access (DMA) 308 via the PCIe. Of course, the local device 102B can also be configured to utilize the processor 108B to write the remote frame buffer 210 to local memory 112. Further, as discussed below, the processor 108B includes iGFX 310 which performs decompression, decryption, and rendering of the video data.

In wireless (e.g., WiGig) Host Mode, the local computing device 102B receives, via the wireless connection 106, the compressed (and generally encrypted if premium content) video data from the remote computing device 104 and writes the compressed and encrypted video data to local memory 112. Thus, in contrast to FIG. 2, the compressed and encrypted video data may be written to memory 112 instead of being processed via a wireless or WiGig docking configuration. The encrypted and compressed remote frame buffer 210 is stored in local memory 112. The iGFX 310 may read the encrypted and compressed remote frame buffer 210 from memory 112 through any suitable system interconnect 312.

The local device 102B via the iGFX 310 may then decompress the received video data in the decompression module 314 (e.g. H.264 decompression) and decrypt the received video data with the decrypt module 316. The local device 102B may also, via the iGFX 310, render a composite frame buffer 318 merging its local frame buffer 320 and the remote frame buffer 210 from the remote computing device 104. The local device 102B can use any suitable system interconnect 322 to output the composite frame buffer 318 to its display 324 to present the native or local screen frame 326 and the remote screen 328 Thus, both the native screen 326 and the remote screen 328 may be displayed at the same time such as in PIP mode. In certain examples, as indicated, the processor 108B is configured with iGFX 310 (such as with the Intel® GT series, for example) to perform the decompression, decryption, and rendering of the composite frame buffer 318. As also indicated, the processor 108B and the iGFX 310 may interface with the wireless (e.g., WiGig) Host Mode configuration 302 via a PCIe 306, for example.

For premium video content support, the local computing device 102B may incorporate decryption (e.g., HDCP2 decryption) along with encryption keys (e.g., HDCP2 keys) since the local device 102B may be acting as an HDCP or HDCP2 receiver, for example. Further, PAVP hardware may provide additional protection. Again, the remote video content is stored, decrypted, decompressed, and rendered into the composite frame buffer 318 which then is output to the display 324 of the local device 102B. Thus, end-to-end premium video content sharing and PIP on the display of the local device 102B may be accommodated.

Advantages may include reduced cost and size of the wireless or WiGig adapter or controller via performing decompression and decryption with the iGFX 310 instead of with a wireless controller in a docking configuration. Further, power could be lower when processing iGFX 310 instead of the discrete wireless controller 116B.

FIG. 4 is the first computing device or local computing device 102B (e.g., an AIO computer, laptop computer, desktop computer, etc.) of FIG. 3 as configured for premium video content. In wireless Host Mode, the wireless (e.g., WiGig) Host Mode configuration 302 controller 116B in the device 102B platform receives compressed, e.g., H.264 compressed, and encrypted, e.g., HDCP2 encrypted, video from the remote device 104 (or other computing device) via a wireless connection 106. The encrypted and compressed video may be received via WDE packets, for instance, over a WiGig or other multi-gigabit-per-second wireless connection 106. In the illustrated embodiment, the compressed/encrypted video is written out to local memory 112 via a DMA 306 through the PCIe interface on the wireless Host Mode configuration 302 controller 116B. The local computing device 102B having the iGFX 310 including iGFX controller 402 may have PAVP 404 hardware or similar hardware to encrypt/decrypt video data to and from its memory 112 to support end-to-end premium video content sharing.

The iGFX 310 including the iGFX controller 402 reads the encrypted/compressed remote frame buffer 210 through any suitable system interconnect 312 and performs decryption with a decryption module 316 (e.g., HDCP2 decryption) and may utilize encryption/decryption keys 406 (e.g., HDCP2 keys). In embodiments, the local device 102B acts as an HDCP2 or similar receiver. The iGFX 310 and iGFX controller 402 then decompresses the video (e.g., H.264 video) using a decompression module 314 and render the composite frame buffer 318 in memory using PAVP 404, for example. The composite frame buffer 318 is read via the iGFX controller 402 from the memory 112 by the display engine (DE) 408 and output through any suitable system interconnect 322 to the display 324 (e.g., an AIO panel). The iGFX controller 402 and PAVP 404 performs encryption/decryption of video data to and from memory 112.

In sum, the local device 102B may have a wireless Host Mode configuration with a wireless controller 116B for multi-gigabit-per-second transmission (e.g., WiGig). The local device 102B supports DMA of encrypted/compressed video from the wireless controller 116B to memory 112 via PCIe. The local device 102B including its processor 108B having integrated graphics iGFX 310 with iGFX controller 402 generates a composite frame buffer merging a remote frame buffer and local frame buffer, and that may give PIP. The local device 102B may accommodate various encryption/decryption systems including having HDCP2 keys for HDCP2 decryption, PAVP hardware to encrypt/decrypt to and from memory 112 to facilitate protected end-to-end delivery of content through the local device 102, and other encryption/decryption systems.

Figure 5:
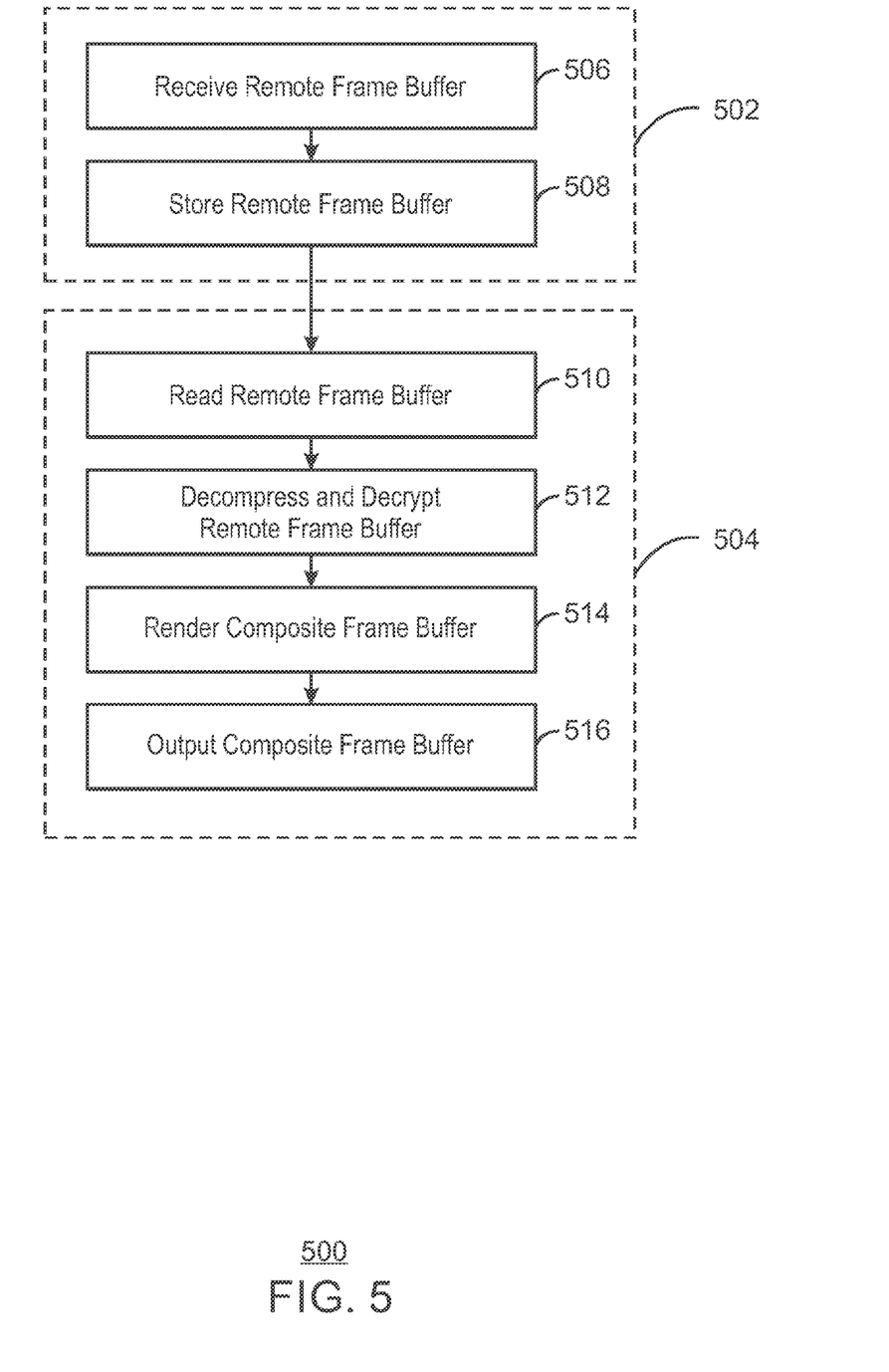
FIG. 5 is a block flow diagram of a method sharing content in accordance with embodiments of the present techniques.

FIG. 5 is a method 500 of premium video content sharing, such as in receiving content at a first or local device (e.g., a sink) from a second or remote device (e.g., a source) over a high-speed (multi-gigabit-per-second or WiGig) wireless connection. The actions expressly listed in this illustrated embodiment are actions at the first device. Further, the actions depicted are divided into actions 502 performed or directed by the wireless network controller of the first device, and actions 504 performed or directed by the integrated graphics controller of the processor in the first device. Of course, the actions may be divided differently among the wireless controller and integrated graphics controller, and/or performed or directed by other components.

In the illustrated embodiment, the method 500 includes receiving (506) a multi-gigabit-per-second transmission of video data including a compressed and encrypted remote frame buffer from the second computing device at the wireless network controller (e.g., a WiGig controller) of the first computing device. The wireless controller stores (508) the compressed and encrypted remote frame buffer in memory of the first computing device. For instance, the wireless controller may store the compressed and encrypted remote frame buffer with a direct memory access (DMA), such as over a peripheral component interconnect express (PCIe) path (e.g., at a PCIe interface between the wireless controller and a processor in the first device).

In the method 500, the integrated graphics (iGFX) controller associated with the processor (e.g., CPU) of the first computing device reads (510) the compressed and encrypted remote frame buffer from the memory. The integrated graphics controller decompresses and decrypts (e.g., for HDCP2 decryption) the remote frame buffer, as indicated in block 512. The integrated graphics controller renders (514) a composite frame buffer of the remote frame buffer and a native or local frame buffer of the first device, and outputs (516) the composite frame buffer to a display. The display may be a component of the first computing device (e.g., an AIO computer, a laptop computer, and the like). The composite frame buffer is presented as a composite frame (remote screen and local screen) in picture-in-picture (PIP) mode on the display.

The integrated graphics controller, in rendering (514) the composite frame buffer, may encrypt the composite frame buffer so that the composite frame buffer is encrypted when in memory. Further, the integrated graphics controller, in outputting (516) the composite frame buffer to display, reads the encrypted composite frame buffer from memory, decrypts the encrypted composite frame buffer, and outputs the decrypted composite frame buffer (e.g., via a display engine of the integrated graphics) to the display. Such encryption to memory and decryption from memory may be performed via PAVP hardware of the integrated graphics to protect the composite frame buffer and other video data in the memory, and to give end-to-end protection of premium content through the first device.

In summary, embodiments of the present techniques provide a computing device configured for a content sharing system and to receive content from a remote computing device. The computing device may include a display and a memory. Further, the computing device may include a wireless network controller (e.g., WiGig controller) to receive a multi-gigabit-per-second wireless transmission of video data including a compressed and encrypted remote frame buffer from the remote computing device. The wireless controller may be configured to store the compressed and encrypted remote frame buffer in the memory. In a particular example, the wireless controller is configured to store the compressed and encrypted remote frame buffer in the memory via a direct memory access (DMA).

The computing device may include a processor (e.g., CPU) having integrated graphics including an integrated graphics controller to read the compressed and encrypted remote frame buffer from the memory, decompress and decrypt the remote frame buffer, and render a composite frame buffer in the memory, wherein the composite frame buffer is a composite of the remote frame buffer and a native or local frame buffer of the computing device. Moreover, the integrated graphics and integrated graphics controller may be configured to encrypt the composite frame buffer to the memory and decrypt the composite frame buffer from the memory. Furthermore, the integrated graphics controller may be configured to output the composite frame buffer, such as via a display engine (DE), to a display of the computing device. The integrated graphics controller may output the composite frame buffer to the display for presentation in picture-in-picture (PIP) on the display.

Embodiments of the present techniques also provide a video content sharing system including a first computing device and a second computing device. The first computing device may include a display and a memory. The first device may also include a multi-gigabit-per-second wireless network controller (e.g., a WiGig controller) to receive a compressed and encrypted remote frame buffer from the second computing device, and to store (e.g., via a DMA) the compressed and encrypted remote frame buffer in the memory of the first device.

The first device may include a processor (e.g., CPU) having integrated graphics (iGFX) including an iGFX controller to read the compressed and encrypted remote frame buffer from the memory, decompress and decrypt (e.g., HDCP2 decryption) the remote frame buffer, and render a composite frame buffer of the remote frame buffer and a local frame buffer of the first computing device. Additionally, the iGFX controller may be configured to encrypt the composite frame buffer to the memory and decrypt the composite frame buffer from the memory, and wherein the iGFX may include a display engine to output the composite frame buffer to the display for presentation in picture-in-picture (PIP) on the display. The second computing device may include a memory to store the remote frame buffer for transmission to the first computing device. The first and second computing devices may be an AIO computer, laptop computer, a desktop computer, a tablet computing device, and other computing devices.

EXAMPLE 1

A method of premium video content sharing is described herein. The method includes receiving a multi-gigabit-per-second transmission of a compressed and encrypted remote frame buffer at a wireless controller of a first computing device from a second computing device, and storing the compressed and encrypted remote frame buffer in memory of the first computing device. The method includes performing via an integrated graphics controller of a processor of the first computing device: reading the compressed and encrypted remote frame buffer from the memory; decompressing and decrypting the remote frame buffer; rendering a composite frame buffer of the remote frame buffer with a local frame buffer of the first device; and outputting the composite frame buffer to a display.

In some embodiments, the wireless controller is a Wireless Gigabit Alliance (WiGig) controller, and wherein the processor is a central processing unit (CPU) having integrated graphics including the integrated graphics controller. In some embodiments, the compressed and encrypted remote frame buffer is stored in the memory via a direct memory access (DMA) from the wireless controller, such as over a peripheral component interconnect express (PCIe) path. In some embodiments, decrypting the remote frame buffer involves decrypting the remote frame buffer with High-bandwidth Digital Content Protection (HDCP2) decryption.

Further, the rendering of the composite frame buffer may involve encrypting the composite frame buffer and storing the encrypted composite frame buffer in the memory, and wherein outputting the composite frame buffer may involve reading the encrypted composite frame buffer from memory, decrypting the encrypted composite frame buffer, and outputting the composite frame buffer via a display engine to the display. The composite frame buffer may be presented as a composite frame in picture-in-picture (PIP) mode on the display, wherein the display is a display of the first device.

EXAMPLE 2

A computing device configured for a content sharing system and to receive content from a remote computing device is described herein. The computing device includes a memory and a wireless controller to receive a multi-gigabit-per-second wireless transmission of a compressed and encrypted remote frame buffer from the remote computing device, and to store the compressed and encrypted remote frame buffer in the memory. The computing device includes a processor having an integrated graphics controller to read the compressed and encrypted remote frame buffer from the memory, decompress and decrypt the remote frame buffer, and render a composite frame buffer in the memory, the composite frame buffer having the remote frame buffer and a native frame buffer of the computing device.

In some embodiments, the wireless controller is a Wireless Gigabit Alliance (WiGig) controller, and wherein the processor includes a central processing unit (CPU) having integrated graphics including the integrated graphics controller. The wireless controller may be configured to store the compressed and encrypted remote frame buffer in the memory via a direct memory access (DMA), for instance. Further, in some embodiments, the integrated graphics controller is configured to encrypt the composite frame buffer to the memory and decrypt the composite frame buffer from the memory.

Moreover, the integrated graphics controller may be configured to output the composite frame buffer via a display engine (DE) to a display. The computing device may include the display. The integrated graphics controller may be configured to output the composite frame buffer to a display for presentation in picture-in-picture (PIP) on the display.

EXAMPLE 3

A video content sharing system is described herein. The system includes a first computing device having a display, a first memory, and a multi-gigabit-per-second wireless network controller to receive a compressed and encrypted remote frame buffer from a second computing device. The multi-gigabit-per-second wireless network controller is configured to store the compressed and encrypted remote frame buffer in the first memory. Additionally, the first computing device includes a processor having integrated graphics (iGFX) including an iGFX controller to decompress and decrypt the remote frame buffer. Further, the iGFX controller is configured to render a composite frame buffer of the remote frame buffer and a local frame buffer of the first computing device. Lastly, the video content sharing system includes the second computing device comprising a second memory to store the remote frame buffer for transmission to the first computing device.

In some embodiments, the multi-gigabit-per-second wireless network controller may include a Wireless Gigabit Alliance (WiGig) controller configured to store the compressed and encrypted remote frame buffer in the first memory with a direct memory access (DMA). The iGFX controller may be configured to read the compressed and encrypted remote frame buffer from the first memory. The processor may include a central processing unit (CPU). The first device may be a High-bandwidth Digital Content Protection (HDCP2) device.

In some embodiments, the iGFX controller is configured to encrypt the composite frame buffer to the first memory and decrypt the composite frame buffer from the first memory. Further, the iGFX may have a display engine to output the composite frame buffer to the display for presentation in picture-in-picture (PIP) on the display. In some embodiments, the first computing device may be an all-in-one (AIO) computer. In some embodiments, the second computing device may be a tablet computer device.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method of premium video content sharing, comprising:
    receiving a multi-gigabit-per-second transmission of a compressed and encrypted remote frame buffer at a wireless controller of a first computing device from a second computing device;
    storing the compressed and encrypted remote frame buffer in memory of the first computing device; and
    performing via an integrated graphics controller of a processor of the first computing device:
        reading the compressed and encrypted remote frame buffer from the memory of the first computing device;
        decompressing and decrypting the remote frame buffer;
        rendering a composite frame buffer of the remote frame buffer with a local frame buffer of the first computing device, the rendering comprising encrypting the composite frame buffer and storing the encrypted composite frame buffer in the memory of the first computing device; and
        outputting the composite frame buffer to a display, the outputting comprising reading the encrypted composite frame buffer from the memory of the first computing device and decrypting the encrypted composite frame buffer.

2. The method of claim 1, wherein the wireless controller comprises a Wireless Gigabit Alliance (WiGig) controller, and wherein the processor comprises a central processing unit (CPU), the CPU having integrated graphics including the integrated graphics controller.

3. The method of claim 1, wherein storing the compressed and encrypted remote frame buffer comprises storing the compressed and encrypted remote frame buffer in the memory of the first computing device via a direct memory access (DMA) from the wireless controller.

4. The method of claim 3, wherein the DMA is performed over a peripheral component interconnect express (PCIe) path.

5. The method of claim 1, wherein decrypting the remote frame buffer comprises decrypting the remote frame buffer with High-bandwidth Digital Content Protection (HDCP2) decryption.

6. The method of claim 1, wherein outputting the composite frame buffer comprises outputting the composite frame buffer via a display engine to the display.

7. The method of claim 1, comprising presenting the composite frame buffer as a composite frame in picture-in-picture (PIP) mode on the display, wherein the display comprises a display of the first computing device.

8. A computing device configured for a content sharing system and to receive content from a remote computing device, the computing device comprising:
    a memory;
    a wireless controller to receive a multi-gigabit-per-second wireless transmission of a compressed and encrypted remote frame buffer from the remote computing device, and to store the compressed and encrypted remote frame buffer in the memory; and
    a processor having an integrated graphics controller to:
        read the compressed and encrypted remote frame buffer from the memory;
        decompress and decrypt the remote frame buffer;
        render a composite frame buffer in the memory, the composite frame buffer comprising the remote frame buffer and a native frame buffer of the computing device;
        encrypt the composite frame buffer to the memory and decrypt the composite frame buffer from the memory; and
        output the composite frame buffer to a display.

9. The computing device of claim 8, wherein the wireless controller comprises a Wireless Gigabit Alliance (WiGig) controller, and wherein the processor comprises a central processing unit (CPU), the CPU having integrated graphics including the integrated graphics controller.

10. The computing device of claim 8, wherein the wireless controller is configured to store the compressed and encrypted remote frame buffer in the memory via a direct memory access (DMA).

11. The computing device of claim 8, wherein the integrated graphics controller is configured to encrypt the composite frame buffer to the memory and decrypt the composite frame buffer from the memory.

12. The computing device of claim 8, wherein the integrated graphics controller is configured to output the composite frame buffer via a display engine (DE) to the display.

13. The computing device of claim 12, wherein the computing device comprise the display.

14. The computing device of claim 8, wherein the integrated graphics controller is configured to output the composite frame buffer to a display for presentation in picture-in-picture (PIP) on the display.

15. A video content sharing system comprising:
a first computing device comprising a display, a first memory, a multi-gigabit-per-second wireless network controller to receive a compressed and encrypted remote frame buffer from a second computing device and to store the compressed and encrypted remote frame buffer in the first memory, and a processor having integrated graphics (iGFX) including an iGFX controller to:
decompress and decrypt the remote frame buffer and render a composite frame buffer of the remote frame buffer and a local frame buffer of the first computing device;
encrypt the composite frame buffer to the first memory and decrypt the composite frame buffer from the first memory; and
output the composite frame buffer to the display; and
the second computing device comprising a second memory to store the remote frame buffer for transmission to the first computing device.

16. The video content sharing system of claim 15, wherein:
the multi-gigabit-per-second wireless network controller comprises a Wireless Gigabit Alliance (WiGig) controller configured to store the compressed and encrypted remote frame buffer in the first memory with a direct memory access (DMA); and
the iGFX controller is configured to read the compressed and encrypted remote frame buffer from the first memory.

17. The video content sharing system of claim 15, wherein the processor comprises a central processing unit (CPU), and wherein the first computing device comprises a High-bandwidth Digital Content Protection (HDCP2) device.

18. The video content sharing system of claim 15, wherein the iGFX comprises a display engine to output the composite frame buffer to the display for presentation in picture-in-picture (PIP) on the display.

19. The video content sharing system of claim 15, wherein the first computing device comprises an all-in-one (AIO) computer.

20. The video content sharing system of claim 15, wherein the second computing device comprises a tablet computer device.

* * * * *